April 27, 1954     J. A. CAMPBELL ET AL     2,676,640
APPARATUS FOR RESHAPING ANNEALING INNER COVERS
Filed Sept. 19, 1952     7 Sheets-Sheet 1
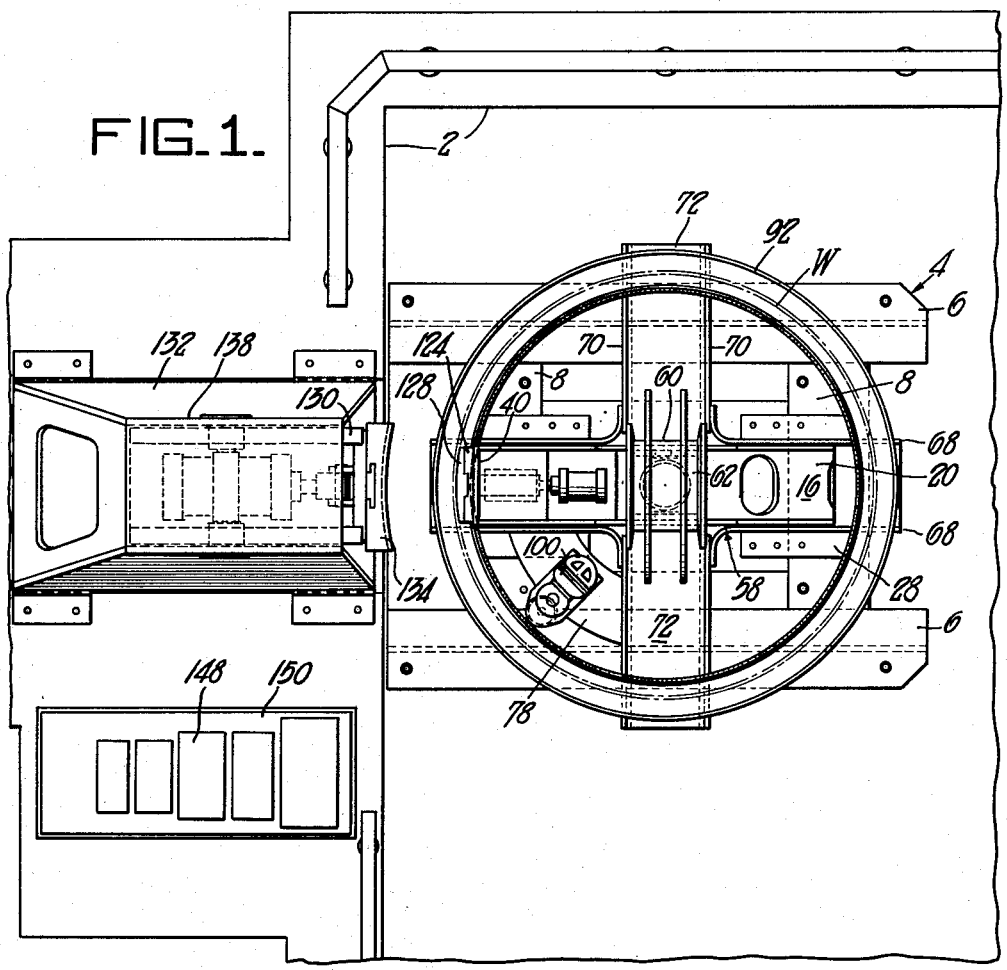
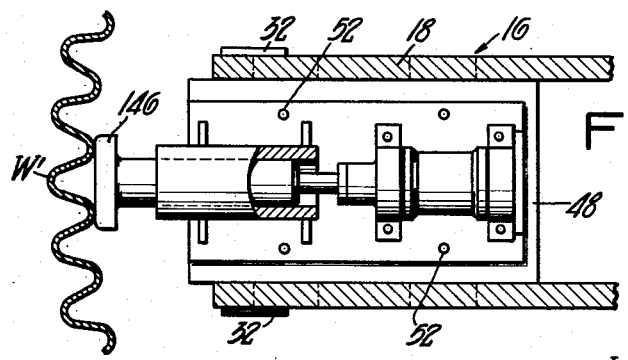
Inventors:
JOHN A. CAMPBELL and
CONSTANT M. SPRUMONT,
by: Donald G. Dalton
their Attorney.

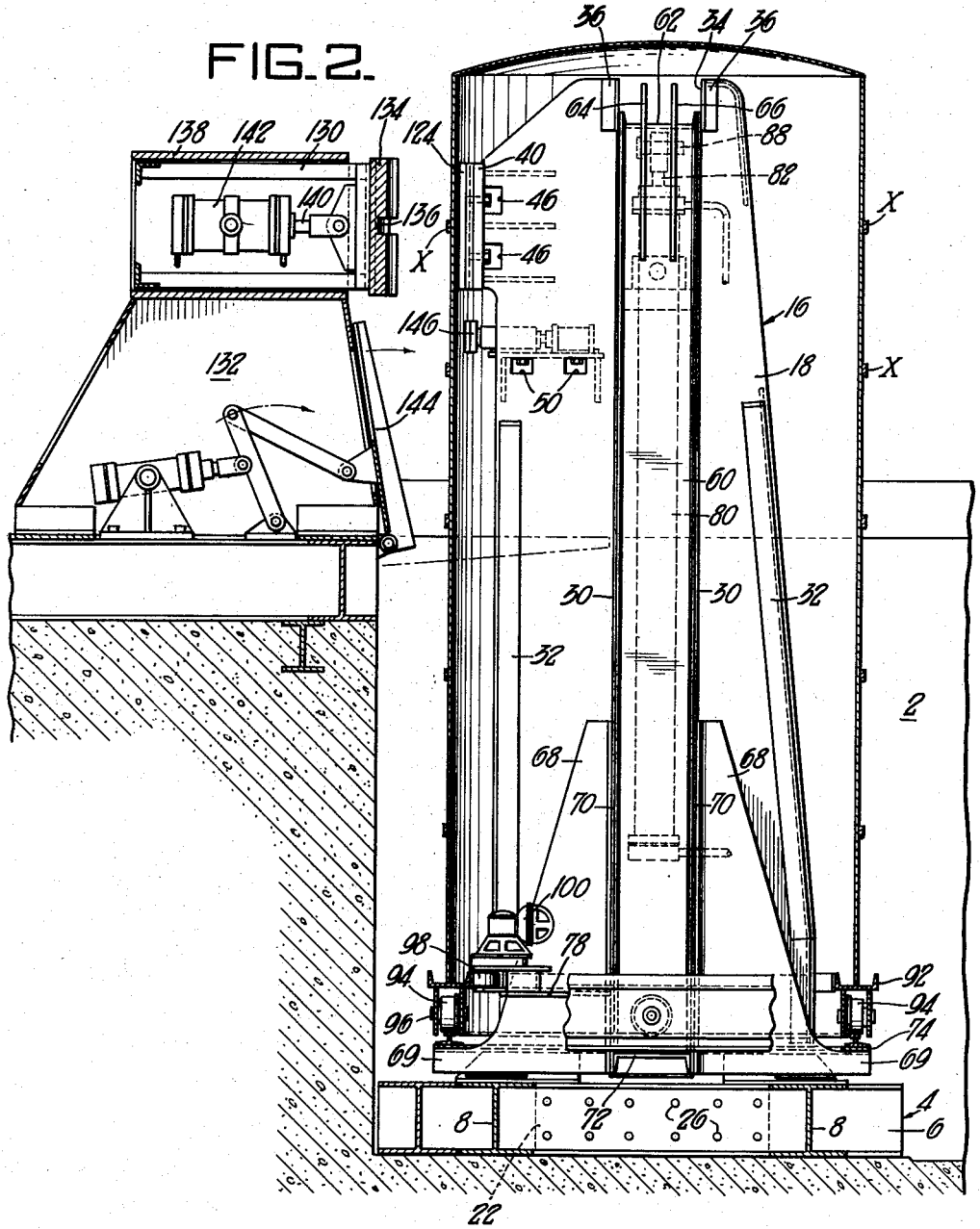

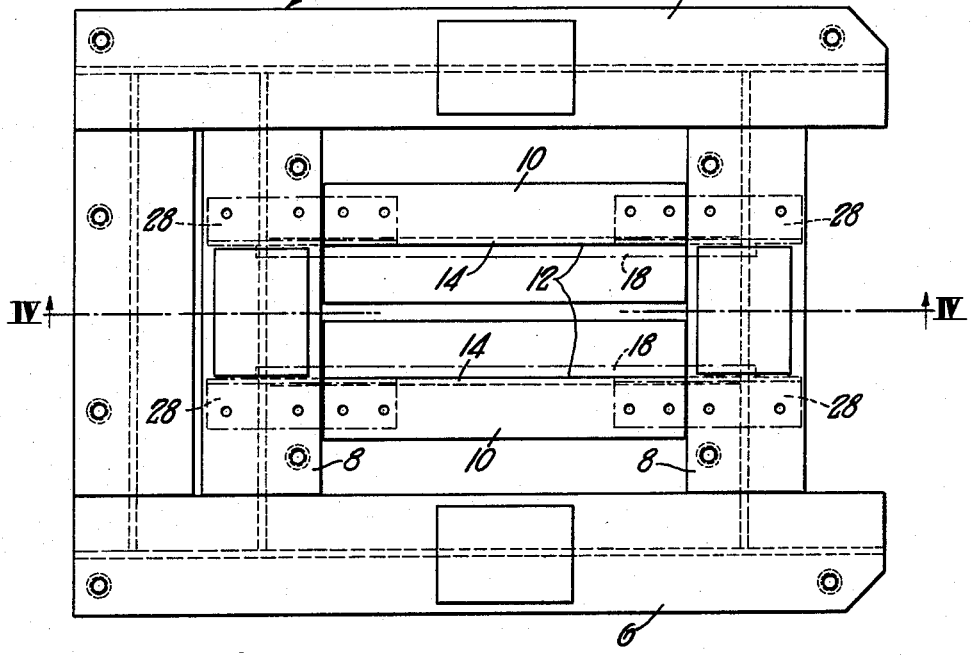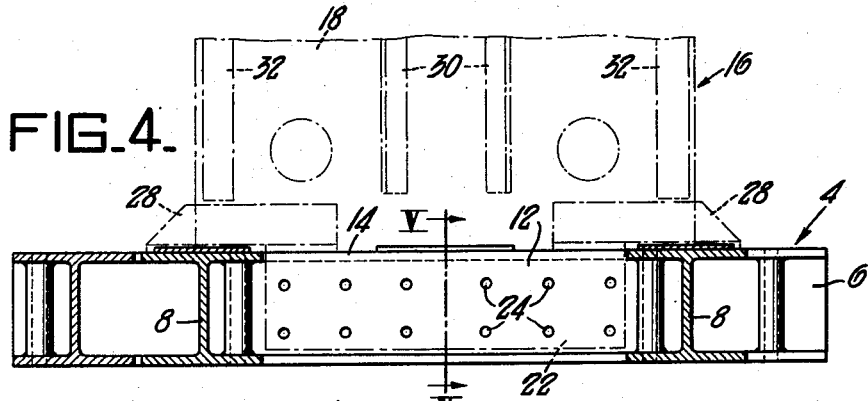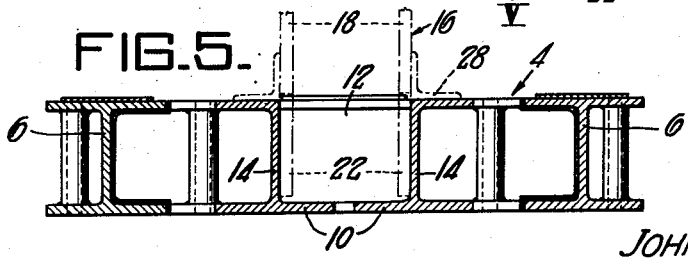

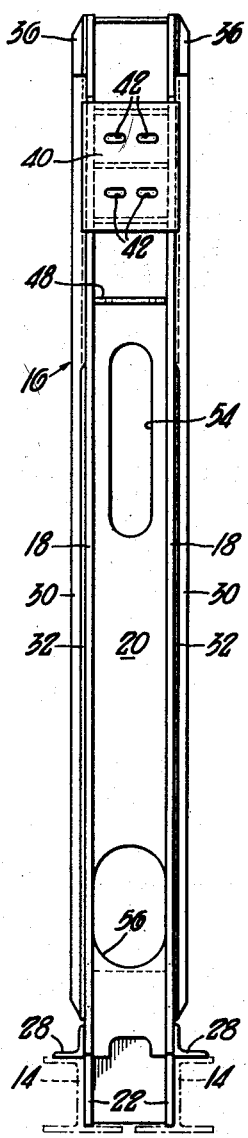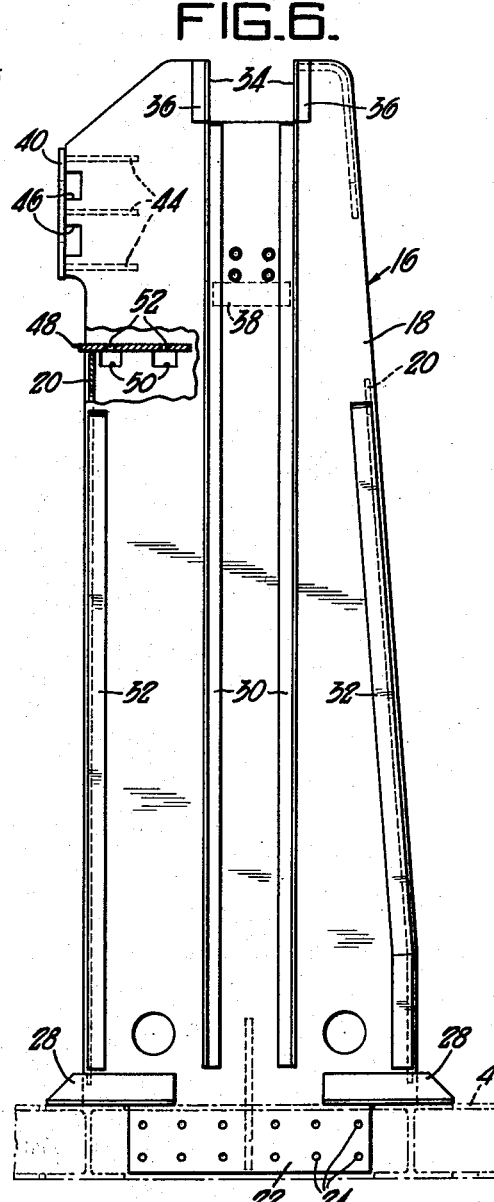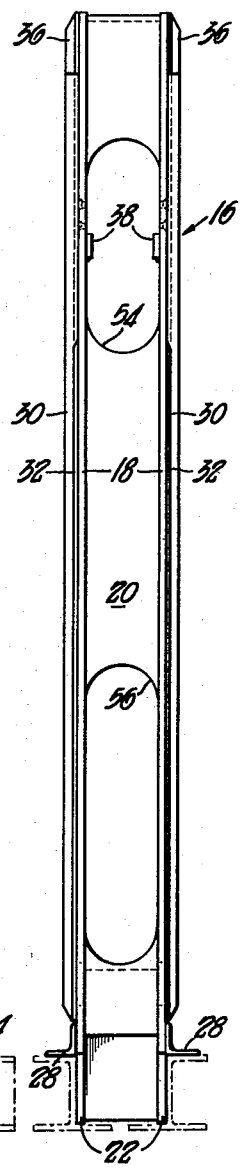

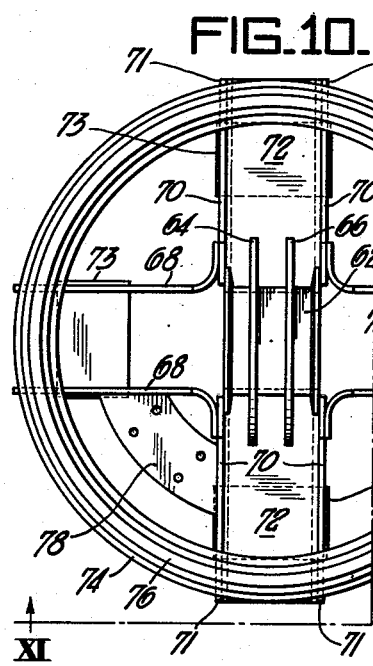

April 27, 1954   J. A. CAMPBELL ET AL   2,676,640
APPARATUS FOR RESHAPING ANNEALING INNER COVERS
Filed Sept. 19, 1952   7 Sheets-Sheet 6
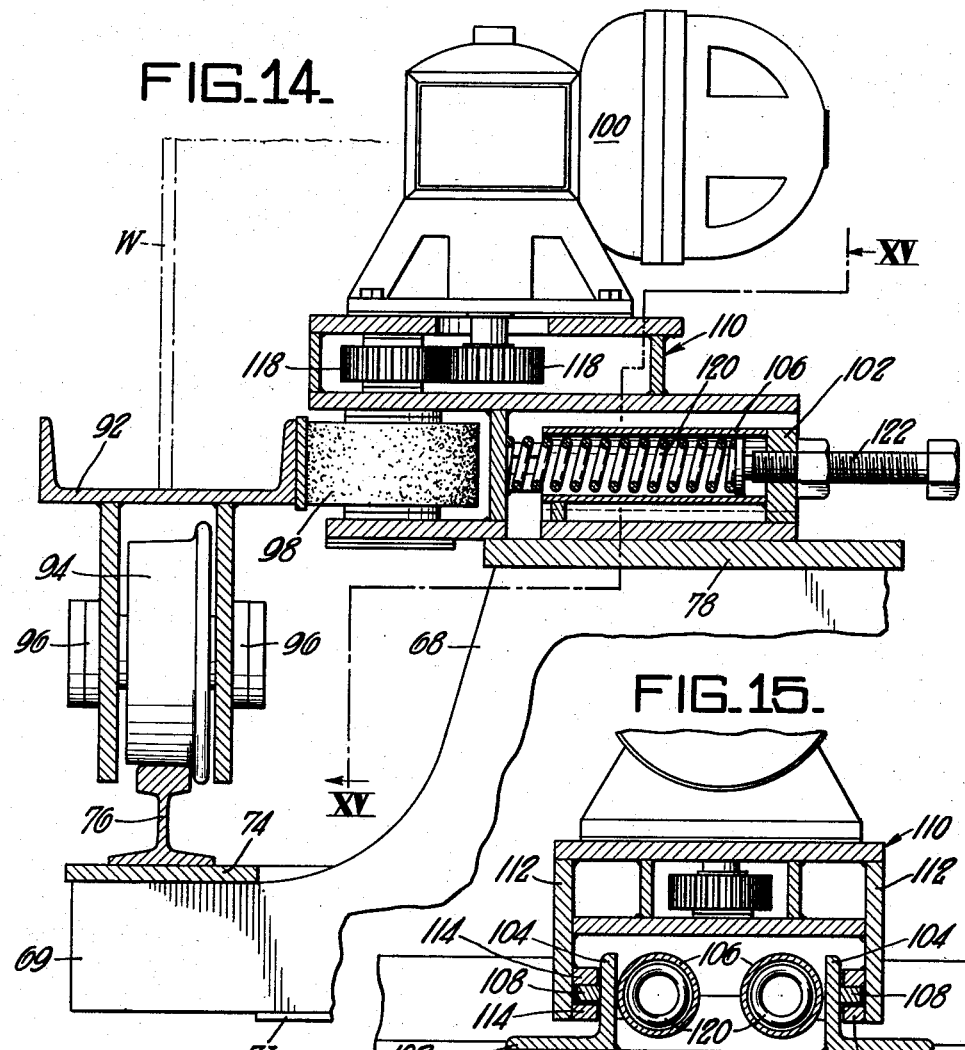
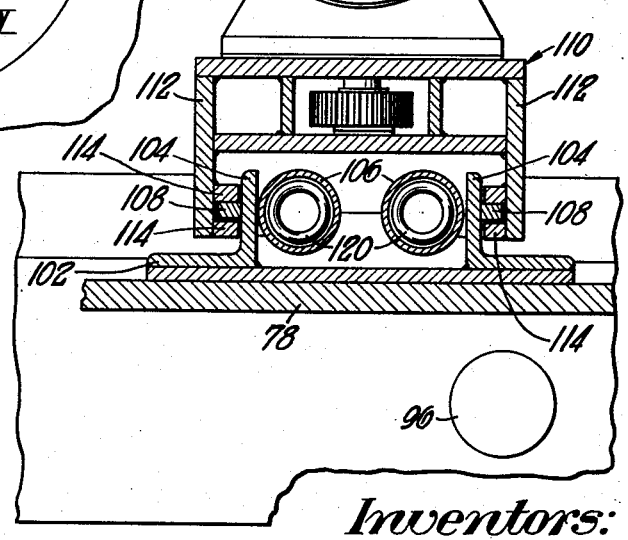
Inventors:
JOHN A. CAMPBELL and
CONSTANT M. SPRUMONT,
by: Donald G. Dalton
their Attorney.

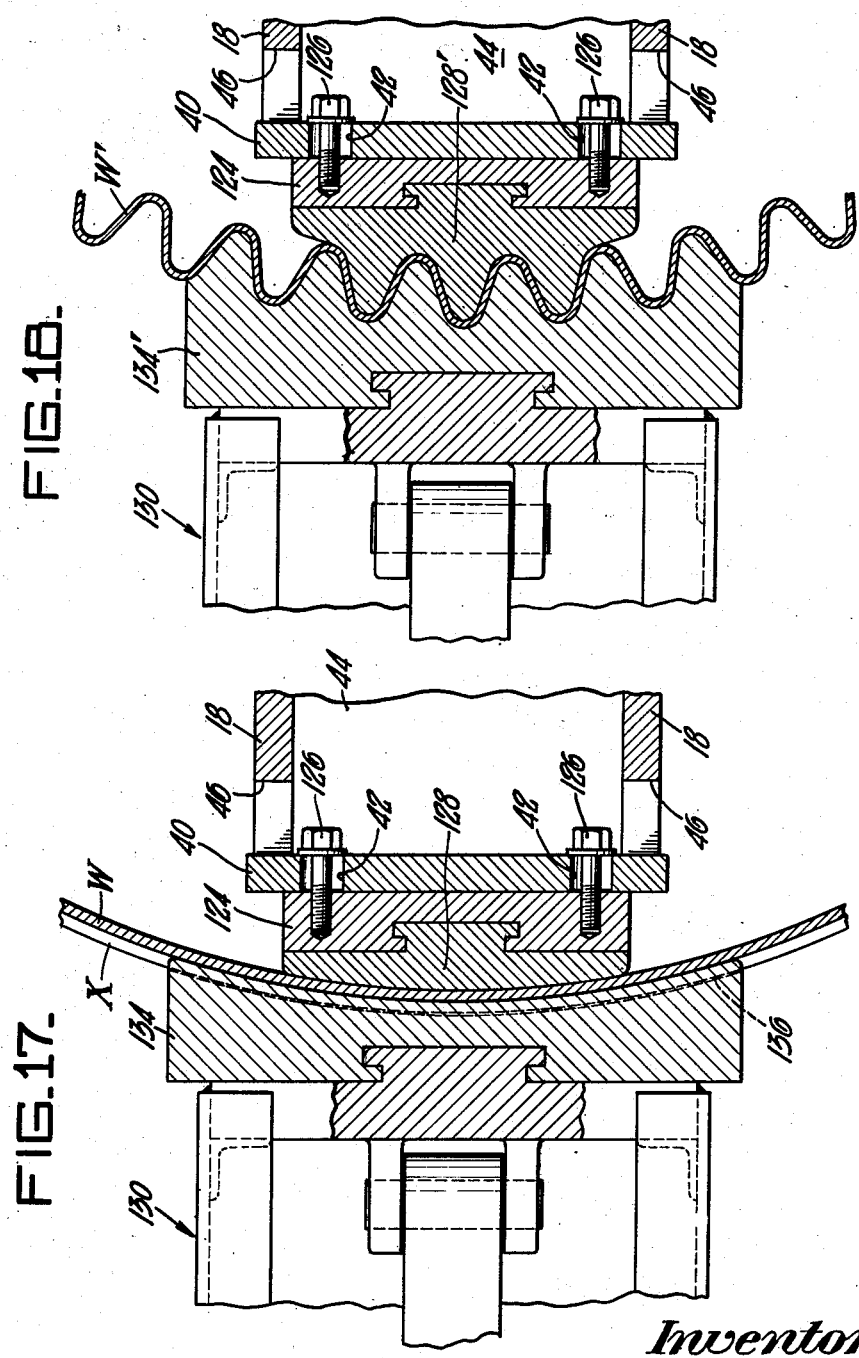

Patented Apr. 27, 1954

2,676,640

UNITED STATES PATENT OFFICE 2,676,640

APPARATUS FOR RESHAPING ANNEALING INNER COVERS

John A. Campbell, Pittsburgh, and Constant M. Sprumont, Duquesne, Pa.

Application September 19, 1952, Serial No. 310,442

11 Claims. (Cl. 153—48)

The present invention relates to apparatus for straightening the inner covers used in box annealing furnaces.

Except for a very small percentage of cold reduced coiled strip, some form of heat treatment is applied as a separate operation to all cold reduced steel products to restore ductility lost during cold reduction. Approximately 95% of this heat treatment is carried on by the box annealing method.

Box annealing equipment ordinarily consists of refractory lined steel bases for receiving the steel charge, which in the case of coiled cold reduced strip is in the form of one or more stacks of coils; furnaces to apply the heat; and inner covers which fit over each stack of coils to confine the protective atmosphere used during annealing to prevent excessive oxidation of the steel.

Inner covers are commonly open bottom thin-walled steel cylinders to fit over the cylindrical charges of stacked coils. The covers are usually made with smooth or corrugated walls which are formed and welded from $\frac{3}{16}$ to $\frac{5}{16}$ inch thick low carbon steel, and from 12 gauge (.1046") to 9 gauge (.1490") stainless steel. The sizes of the covers vary depending on the type of box annealing furnace, the maximum being approximately 78 inches in diameter and approximately 15 feet long.

The inner covers are placed over each stack of coils before the furnace is placed over the entire charge. The covers are deposited on the stacks before annealing and removed after annealing by an overhead crane by means of cables suspended from the crane hook and attached to rings or eyes either around the domelike top of the cover or around its base.

Due to their cumbersome size, shape and thinness of wall construction, the inner covers frequently become dented, bent or otherwise damaged after being in use a relatively short time. Bulging also occurs as a result of the heat to which the covers are constantly exposed. It is, therefore, necessary from time to time to remove the inner cover from service and place it in the shop for repair. During repair, the dents or bulges are removed, any holes are sealed in the walls and the cover is in general straightened. Heretofore this repair work was carried on while the inner cover was manipulated and held suspended by an overhead crane. The great disadvantage arising from this method of operation was the necessity for using the crane during the entire repairing process. While being thus engaged, the crane caused loss of production time in other parts of the mill where moving of material was delayed while the crane was being used for the inner cover repair work.

It is, accordingly, an object of our invention to provide an apparatus for removing the dents and bulges from and straightening the walls of box annealing furnace inner covers whereby the inner covers may be manipulated during repair without the need for a crane.

This and other objects will become more apparent after referring to the following specification and attached drawings, in which:

Figure 1 is a plan view;

Figure 2 is an elevational view partly in section;

Figure 3 is a plan view of the foundation framework;

Figure 4 is a sectional view taken on the line IV—IV of Figure 3;

Figure 5 is a sectional view taken on the line V—V of Figure 4;

Figure 6 is a side elevational view of the vertical frame of the invention;

Figure 7 is an end view of the left side of Figure 6;

Figure 8 is an end view of the right side of Figure 6;

Figure 9 is a top plan view of Figure 6;

Figure 10 is a plan view of the elevating element of the invention;

Figure 11 is a sectional elevational view taken on the line XI—XI of Figure 10;

Figure 12 is a sectional elevational view taken on the line XII—XII of Figure 11;

Figure 13 is a sectional elevational view taken on the line XIII—XIII of Figure 11;

Figure 14 is a sectional elevational view of the operating mechanism for the work-supporting member;

Figure 15 is a cross-sectional view taken on the line XV—XV of Figure 14;

Figure 16 is a plan view of the corrugation disengaging mechanism;

Figure 17 is a sectional plan view of the dies used for reshaping plain wall annealing covers; and Figure 18 is a sectional plan view of the dies used for reshaping corrugated wall covers.

Referring more particularly to the drawings, reference numeral 2 indicates a concrete reinforced pit having disposed on the bottom thereof a stationary base support member 4 which may be made up of two relatively long spaced I-beam members 6, a pair of spaced transverse I-beam members 8 disposed between the members 6 with their ends welded thereto, and a pair of spaced I-beams 10 disposed between the members 8 longitudinally relative to the I-beams 6 with their ends welded to the I-beams 8. The I-beams 10 have the opposing halves of their upper flanges removed so as to provide an opening 12 in the base bordered by the webs 14 of the I-beams 10 on two sides and the flange edges of the I-beams 8 on its other two sides.

A stationary vertical post or column member consisting of a substantially box girder structure 16 is supported in the base 4 and projects upwardly therefrom. The box girder frame 16 is made up of two flat main plates 18 disposed in spaced relation and connected together at their lateral edges by means of a pair of welded plates 20. The bottom portion 22 of each of the plates 18 is provided with bolt holes 24 therethrough and is fitted into the opening 12 of the base 4. The flanges 22 are fastened to the webs 14 of the I-beams 10 by means of bolts 26 which pass through bolt holes 24 and matching bolt holes in the webs 14. A pair of horizontally disposed angle members 28 are welded to the bottom portion of each of the plates 18 and to the top of the base member 4 for strengthening the support of each plate in the base member 4.

A pair of elongated angle members 30 are welded in spaced relation on the outer surface of each of the plates 18 to provide a guideway extending vertically from the bottom to substantially the top thereof. Narrow elongated plate members 32 are welded along the lateral edges of each of the plates 18 to provide skids or runners the function of which will become apparent hereinafter. The upper portion of each plate is cut out at approximately the center of its top edge to form an opening 34. An angle member 36 is provided adjacent each of the side edges of the opening 34 with a flange thereof in alignment with the upturned flange of each of the angle members 30 to thereby constitute extensions of members 30.

A pair of horizontal supporting bars 38 may be welded or otherwise attached on the opposing inner surfaces of the plates 18 a short distance below the opening 34. A plate 40 having four elongated bolt holes 42 therethrough is welded to the edges of the plates 18 on one side and spans the distance therebetween. The plate 40 is disposed just below the upper edges of the plates 18. Three spacer plates 44 are welded in vertically spaced relation to and extend transversely between the inner surfaces of plates 18 immediately behind the plate 40. The plate 40 is further supported by being welded to the ends of the plates 44. Openings 46 are provided in each of the plates 18 adjacent the bolt holes 42 of the plate 40 for the purpose of admitting a tool to loosen or tighten the bolts which pass through the elongated bolt holes 42. Spaced slightly below the plate 40 is a horizontal platform 48 which is welded between the plates 18 and extends from the one edge of the plates to a point short of the center line thereof. Two spaced holes 50 are provided through each of the plates 18 adjacent the platform 48 for the purpose of admitting tools or wrenches therethrough to tighten bolt members which are accommodated in holes 52 of the platform 48 to secure a fluid cylinder actuated plunger 146 thereon.

Each of the plates 20 is provided with an upper cut out portion 54 and a lower cut out portion 56 to provide access to the space between the plates.

The elevating or lifting member 58 of the device is formed in the shape of a box sleeve having open sides and is made up of a pair of vertically disposed channel members 60 and a transverse connecting channel member 62 welded together to form a unitary structure. The connection of channel member 62 and the channels 60 is strengthened by two web plates 64 and 66 which are welded around the outside of the upper portion of the member 58 as best shown in Figures 11 and 12.

The bottom portion of the lifting member 58 is braced by means of four vertically disposed angular gusset plates 68 having outwardly projecting lower ends 69 and four straight vertically disposed gusset plates 70 which have outwardly projecting lower ends 71. The gusset plates are disposed around the bottom third of the sleeve in alternate pairs as best shown in Figures 10 and 11. A straight gusset plate 70 is welded or otherwise attached by one edge to each flange of each of the two channel members 60 and extends outwardly therefrom coextensively therewith. Each angular gusset plate 68 is welded or otherwise mounted by its curved edge on the inner end of each of the gusset plates 60 and extends outwardly normal therefrom. The outer edges of each of the gusset plates 68 and 70 slope downwardly and outwardly to form the outwardly projecting lower ends 69 and 71 respectively. The ends 69 and 71 extend outwardly to a common radial distance from the sleeve so that they define arcs of a common circle around the sleeve.

A horizontal channel member 72 is welded to and between the bottom portions of each pair of straight gusset plates 70. Each of the channel members 72 is welded by one end to the web of one of the upright channel members and extends away parallel with the bottom edges of the straight gusset plates on each side. A rectangular bed plate 73 supports each pair of angular and straight gusset plates.

A ring plate 74 is disposed around the bottom of the elevating member and is welded in position to the top of the channels 72 and to the tops of the outwardly projecting lower ends of the angular and straight bracing plates 68 and 70. The circular plate 74 supports a circular rail 76 which may be welded or otherwise attached thereon. In the space between one of the angular gusset plates 68 and one of the straight plates 70 above the rail 76 is disposed a motor support plate 78 which is welded on its ends to the adjoining brace plates 68 and 70.

The lifting member 58 is telescoped over the column 16 with the channel members 60 fitted in the guideway between the angle members 30 for vertically sliding movement therein. The inner surfaces of the plates 68 rest upon and are slidable along the elongated plate members 32. A lubricant is applied on the elongated plates 32 to facilitate the sliding movement of the plates 68.

A fluid cylinder 80 having a piston rod 82 projecting from the upper end thereof is vertically disposed between the plates 18 and is supported by means of a trunnion 84 which in turn is supported by the bars 38 on the inner surfaces of the plates 18. The channel member 62 is provided with a clevis 86 depending from its underside to which the piston rod of the cylinder 80 is connected by means of a pin 88. When fluid is admitted to the bottom of the cylinder 80 through a fluid supply line 90, the piston rod 82 is caused to move outwardly of the cylinder to raise the lifting frame 58.

A channel ring member 92 is mounted for rotation on the rail 76 by means of wheels 94 which are journaled in bearings 96 depending from the bottom of the ring member at spaced intervals.

Rotation of the ring 92 is achieved by means of a friction wheel 98 which engages the inner peripheral flange of the ring 92 and is driven by means of a motor 100 which is supported on plate 78.

Mounted on plate 78 is a spring housing 102 having spaced abutments or sidewalls 104 to which spring tubes 106 are attached. Each of the sidewalls 104 has a horizontal rail 108 extending outwardly thereof. A gear case 110 having spaced depending sidewalls 112 which are provided with a pair of inwardly projecting guides 114 slidable on the rails 108. The friction wheel 98 is journaled vertically in the gear case 110 and is driven by the motor 100 through suitable gears 118 mounted on the gear case. Springs 120 in the tubes 106 exert a radial outward pressure on the gear case to urge the friction wheel against the channel ring 92. A pair of adjusting screws 122 provide adjustable back up bearings for the springs 120. This arrangement insures positive engagement of the friction wheel 98 and the channel ring 92 as the diameter of the friction wheel 98 is reduced by wear.

A fixed die holder 124 is mounted on the plate 40 by means of bolts 126 which pass through the elongated bolt holes 42. The die holder 124 removably supports an anvil die 128. The die 128 is provided with a convex face to fit the curved walls of the shells or covers to be worked on. A reciprocating die holder 130 is supported adjacent the anvil die holder 124 on a platform 132 and carries a hammer die 134 which cooperates with anvil die 128. The face of the die 134 is provided with a concave curvature to accommodate the convex face of die 128. The die 130 has a central horizontal slot 136 in its face to accommodate the reinforcement bands X extending around the cover. The die holder 130 slides between guides 138 to cause reciprocation of the die 134 with anvil die 128. The die holder 130 is attached to and moved by a piston rod 140 of a fluid cylinder 142 which is supported on the platform 132. The anvil die and the reciprocating die may be shaped, as shown by dies 128 and 130, for straightening a smooth walled inner cover or they may be provided with matching toothed faces, as shown by dies 128' and 130', for straightening covers having corrugated walls as shown in Figure 18.

A hydraulically operated retractable platform 144 which is adapted to span the portion of the pit 2 between its edge and center is provided adjacent the support 132 to facilitate interchanging of dies in the die holders 124 and 130. The platform 144 also serves as a support for workmen in reaching other elements of the device for the purpose of maintenance or repair. When the inner cover to be straightened is of the corrugated type, it is necessary to disengage the corrugations from the anvil die after straightening. For this purpose a hydraulic-cylinder-operated plunger 146 is provided on the platform 48 disposed beneath the fixed die holder 126.

As shown in Figures 1 and 2, we have found it preferable to install the base support of our device below floor level in order to facilitate handling of the inner covers to be worked on.

In operation, an inner cover W to be repaired is carried to the device by means of a crane (not shown) and deposited with its bottom edge resting on the ring 92 between the flanged edges thereof. The crane is then disengaged from the inner cover and is free to move to other parts of the plant. After the inner cover has been deposited on the ring 92, the operator, by means of controls 148 disposed on an operating panel 150, raises the cover by admitting fluid to the bottom of the cylinder 80 to raise frame 58 and rotates it by actuating the motor 100 to rotate the ring 92. The operator thus manipulates the cover until the dent to be removed is positioned between the anvil die 128 and the reciprocating hammer die 134. Thereupon, the operator causes the fluid cylinder 142 to be actuated which in turn causes the reciprocating die 134 to be pressed against the portion of the inner cover which lies between the hammer die 134 and the anvil die 128. After the dent has been removed, the operator again rotates the cover and elevates or lowers it to inspect the remainder of the wall and to straighten any other dents therein.

In the event that the cover is of the corrugated type, the operation is the same with the exception that after the cover has been straightened between the anvil die 128' and the reciprocating die 134', the plunger 146 is put into action to disengage the corrugations from the teeth on the face of the anvil die. When the plunger 146 moves forward in achieving the separation, the entire cover is moved laterally in the direction of the movement of the plunger 146. The flanged edges of the ring 92 prevent the cover from moving off of the ring when the plunger 146 is actuated.

After the straightening operation has been completed, the cover is removed by means of an overhead crane.

While one embodiment of our invention has been shown and described, it will be apparent that other adaptations and modifications may be made without departing from the scope of the following claims.

We claim:

1. Apparatus for reshaping the side wall of an open-bottomed cylindrical metal enclosure comprising a base, a column upstanding on said base, an anvil on one side of said column adjacent the top thereof, a sleeve telescoped over said column, said sleeve being mounted for vertical movement relative to said column and said anvil, a bottom ring secured around said sleeve, a ring rotatable on said bottom ring and adapted to receive the bottom edge of an enclosure, means for rotating said second-named ring, means for raising and lowering said sleeve, and a hammer die mounted on a fixed support for movement toward and from said anvil.

2. Apparatus for reshaping the side wall of an open-bottomed cylindrical enclosure as defined in claim 1 characterized by said column being rectangular in cross section and having vertical guides on the outer surface thereof along which the sleeve is slidable.

3. Apparatus for reshaping the side wall of an open-bottomed cylindrical metal enclosure comprising a base, a column upstanding on said base, an anvil on one side of said column adjacent the top thereof, a sleeve telescoped over said column, said sleeve being mounted for vertical movement relative to said column and said anvil, said sleeve being in the form of an elongated hollow body having two open sides, an open end and a closed end, a plurality of spaced vertically disposed bracing plates secured to the lower portion of said sleeve, each of said plates having an outwardly projecting lower end, a bottom ring rigidly mounted on said projecting lower ends surrounding said sleeve, a ring rotatable on said bottom ring and adapted to receive the bottom edge of an enclosure, means for rotating said second-mentioned ring, means for raising and lowering said sleeve, and a hammer die mounted on a fixed support for movement toward and from said anvil.

4. Apparatus for reshaping the side wall of an open-bottomed cylindrical metal enclosure comprising a base, a column upstanding on said base, an anvil on one side of said column adjacent the top thereof, a sleeve telescoped over said column, said sleeve being mounted for vertical movement relative to said column and said anvil, said sleeve being in the form of an elongated hollow body having two open sides, an open end and a closed end, a plurality of spaced vertically disposed bracing plates secured to the lower portion of said sleeve, each of said plates having an outwardly projecting lower end, a bottom ring rigidly mounted on said projecting lower ends surrounding said sleeve, a circular rail mounted on said bottom ring, a rotatable ring having spaced wheels depending from the underside thereof mounted for rotation on said rail by means of said wheels and adapted to receive the bottom edge of an enclosure, means for rotating said rotatable ring on said rail, means for raising and lowering said sleeve, and a hammer die mounted on a fixed support for movement toward and from said anvil.

5. Apparatus for reshaping the side wall of an open-bottomed cylindrical metal enclosure as defined in claim 4 characterized by said rotatable ring having upturned flanges along its inner and outer peripheral edges.

6. Apparatus for reshaping the side wall of an open-bottomed cylindrical metal enclosure as defined in claim 5 characterized by said means for rotating said rotatable ring including a driven friction wheel adapted to engage the inner peripheral flange of said rotatable ring to rotate the same, and means carried by said bracing plates for driving said friction wheel.

7. Apparatus for reshaping the side wall of an open-bottomed cylindrical metal enclosure having spaced circumferential reinforcing bands therearound comprising a base, a hollow column upstanding on said base, an anvil on one side of said column adjacent the top thereof, a sleeve telescoped over said column, said column being rectangular in cross section and having vertical guides on the outer surface thereof along which the sleeve is slidable, said sleeve being in the form of an elongated hollow body having two open sides, an open lower end and a closed upper end, said sleeve being disposed with its closed upper end spanning the top of said hollow column, a clevis attached to and depending from the closed end of said sleeve, a pressure fluid cylinder vertically trunnioned within the hollow of said column, a piston rod projecting from the upper end of said cylinder connected by its projecting end with said clevis, means for actuating said cylinder to raise and lower said sleeve, a plurality of spaced vertically disposed bracing plates secured to the lower portion of said sleeve, each of said plates having an outwardly projecting lower end, a bottom ring rigidly mounted on said projecting ends surrounding said sleeve, a circular rail mounted on said bottom ring, a rotatable ring having spaced wheels depending from the underside thereof mounted for rotation on said rail by means of said wheels and adapted to receive the bottom edge of an enclosure, said rotatable ring having upturned flanges along its inner and outer peripheral edges, means for rotating said rotatable ring on said rail, said last named means including a driven friction wheel adapted to engage the inner peripheral flange of said rotatable ring to rotate the same, and means carried by said bracing plates for driving said friction wheel, and a hammer die mounted on a fixed support for movement toward and from said anvil.

8. Apparatus for reshaping the side wall of an open-bottomed cylindrical metal enclosure having spaced circumferential reinforcing bands therearound as defined in claim 7 characterized by said hammer die having a central horizontal slot in the face thereof for accommodating one of said reinforcing bands therein.

9. Apparatus for reshaping the side wall of an open-bottomed cylindrical metal enclosure having spaced circumferential reinforcing bands therearound as defined in claim 8 characterized by said anvil having a convex face and said hammer die having a concave mating face adapted to fit over the face of said anvil.

10. Apparatus for reshaping the side wall of an open-bottomed cylindrical metal enclosure having spaced circumferential reinforcing bands therearound as defined in claim 9 characterized by said anvil face and said hammer die face being provided with interfitting grooved surfaces for accommodating grooved side walls.

11. Apparatus for reshaping the side wall of an open-bottomed cylindrical metal enclosure having spaced circumferential reinforcing bands therearound as defined in claim 10 including a plunger disposed adjacent said anvil in a plane normal to the face thereof for disengaging said side wall from said anvil, and means for actuating said plunger.

References Cited in the file of this patent

UNITED STATES PATENTS

| Number | Name | Date |
|---|---|---|
| 1,647,706 | McArthur | Nov. 1, 1927 |
| 1,695,142 | Dodge | Dec. 11, 1928 |
| 2,442,939 | Schram | June 8, 1948 |

FOREIGN PATENTS

| Number | Country | Date |
|---|---|---|
| 553 | Great Britain | of 1890 |